Patented July 8, 1952

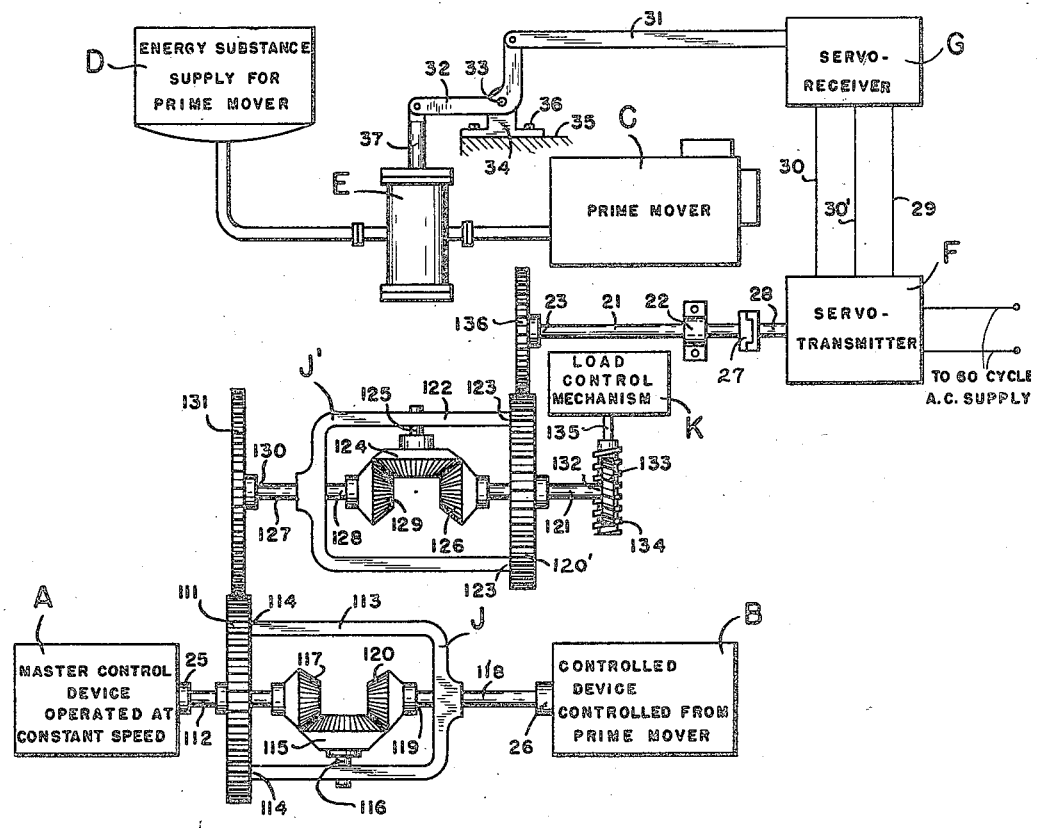

2,602,656

UNITED STATES PATENT OFFICE 2,602,656

DIFFERENTIAL SPEED CONTROL MECHANISM

Hezzie Clark, Houston, Tex.

Application July 16, 1949, Serial No. 105,183

1 Claim. (Cl. 264—9)

This invention relates to a device for causing a prime mover automatically to attain and to maintain a predetermined constant speed irrespective of the load on the prime mover.

The rotative speed of prime movers is commonly controlled by means of governors. The conventional type governors depend for their action upon centrifugal force and consist essentially of a pair of masses rotating about a spindle driven by the prime mover, the speed of which is to be controlled. These masses when rotated tend to fly outwardly and this outward motion is resisted by a controlling force such as a spring. With an increase in speed, the controlling force is overcome and the masses move outwardly. This motion is transmitted to valves supplying the prime mover with its working fluid or fuel, reducing or increasing the supply of working fluid or fuel thereto, depending upon whether the speed of the prime mover is greater than or less than the desired speed. In the past, numerous types of governors have been suggested for controlling of speed of prime movers. Despite their widespread use, all governors permit "hunting" although this characteristic is less pronounced in some types of governors than in others. Furthermore, this tendency to permit "hunting" cannot be entirely eliminated and consequently governors are not suitable for use where it is desired to accurately control the speed of a prime mover. Also, the customary fly-weight types of governors, when not hunting, fail to maintain an accurate, predetermined speed with varying loads.

It is an object of this invention to provide a mechanism for causing a prime mover to attain and continuously to maintain a predetermined constant speed. A further object is to provide a mechanism for causing a prime mover to attain and continuously to maintain a predetermined constant speed irrespective of the load on the prime mover. It is another object of the present invention to provide a mechanism for controlling the speed of a prime mover used for the generation of electric power.

Briefly, the mechanism of my invention consists of a master control device operated at a constant speed, a controlled device the speed of which is controlled by the prime mover, a differential gear assembly mechanically connecting the master control device and the controlled device and means actuated by the differential for translating the rotative motion of the differential to a valve or other mechanism which controls the supply of energy substance to the prime mover. More specifically, the mechanism of my invention comprises a differential drive, one axle of which is mechanically connected to a master control device operated at constant speed, the other axle of which is mechanically connected to the controlled device, a rotatably mounted shaft having a gear mounted thereon for rotation therewith, the said gear meshing with the ring gear of the differential, and means linking said shaft with a control means adapted to regulate the supply of energy substance to said prime mover so as to control the speed thereof.

Having briefly described the device of my invention, it will obvious that I have attained the objects hereinbefore set forth. Other objects and advantages of the present invention will be seen from a reading of the following detailed description taken in conjunction with the single figure of the drawing which is a diagrammatic showing of the device of my invention.

Turning now specifically to the drawing, it will be seen that individual parts are designated by numbers and groups of parts or assemblies are designated by letters, like numerals and like letters indicating corresponding parts and groups of parts respectively throughout.

A designates a master control device operated at constant speed. B designates a device containing rotatable element, the speed of which is controlled by the energy supplied to prime mover C. D designates a source of energy substance for prime mover C, the nature of said source being dependent upon the particular energy substance required by prime mover C. E designates a mechanism for controlling the supply of energy substance D to prime mover C. F designates a servo-transmitter which may suitably be a Selsyn while G designates a servo-receiver which may also suitably be a Selsyn. J designates a first differential gear assembly while J' designates a second differential gear assembly; J and J' may be properly regarded as a double differential gear assembly. K designates a load control mechanism. Load control mechanism K may suitably be of the kind which is physically operated by an operator, for example a crank, or it may be a motor arranged to be actuated from time to time by an operator.

Differential gear assembly J consists of ring gear 111 which is mounted coaxially on shaft 112 and is freely rotatable on said shaft. Spider 113 is rigidly fastened to ring gear 111 at 114. Mounted within spider 113 is bevel gear 115, bevel gear 115 being free to rotate about its axis on pin 116 which is secured to spider 113. It will be apparent that a plurality of gears 115 may be mounted within spider 113 rather than just one such gear, as shown. One end of axle 112 terminates within spider 113 and has mounted on said end bevel gear 117 which meshes with the gears of bevel gear 115. Spider 113 also supports shaft 118, the axis of shaft 118 coinciding with the axis of shaft 112, the inner end 119 of shaft 118 being positioned internally of spider 113 and having mounted thereon for rotation therewith bevel gear 120, the gears of which mesh with the gears of bevel gear 115. Shaft 112 is mechanically connected to rotating element 25 carried by master control device A while shaft 118 is mechanically connected to rotating element 26 of controlled device B. Thus, shaft 112 is arranged to rotate with rotating element 25 while shaft 118 is arranged to rotate with rotatable element 26.

Differential gear assembly J' consists of ring gear 120' which is mounted coaxially on shaft 121 and is freely rotatable on said shaft. Spider 122 is rigidly fastened to ring gear 120 at 123. Mounted within spider 122 is bevel gear 124, bevel gear 124 being free to rotate about its axis on pin 125 which is secured to spider 122. It will be apparent that a plurality of gears 124 may be mounted within spider 122 rather than just the one gear, as shown. One end of axle 121 terminates within spider 122 and has mounted on said end for rotation with said shaft bevel gear 126 which meshes with the gears of bevel gear 124. Spider 122 also supports shaft 127, the axis of shaft 127 coinciding with the axis of shaft 121, the inner end 128 of shaft 127 being positioned internally of spider 122 and having mounted thereon for rotation therewith bevel gear 129. The gears of bevel gear 129 mesh with the gears of bevel gear 124. Mounted on the end 130 of shaft 127 externally of spider 122 is gear 131. The teeth carried by gear 131 mesh with the teeth carried by ring gear 111 of differential gear assembly J. Mounted on the end 132 of shaft 121 is worm gear 133. Gear 133 meshes with worm 134 which is mechanically connected by means of shaft 135 to load control mechanism K, worm 134 being rotatable about its axis when actuated by load control mechanism K.

Shaft 21, which may suitably be affixed to a stationary member by means of journal 22 for rotation about its axis, carries on one end 23 thereof gear 136, gear 136 being so positioned that it meshes with ring gear 120'.

Shaft 21 is linked to energy substance control mechanism E by any suitable means. In the means illustrated, numeral 27 designates a clutch which may be of any suitable type for connecting shaft 21 to shaft 28, shaft 28 operating in conjunction with servo-transmitter F. Servo-transmitter F and servo-receiver G are connected by means of leads 29, 30 and 30'. Servo-receiver G includes a suitable mechanism including member 31 for actuating energy substance controlling mechanism E. Member 31 is shown as linked to bell crank 32 which is adapted to be moved arcuately about pin 33 which mechanically connects bell crank 32 and clevice 34. Clevice 34 may be affixed to a stationary platform 35 as by means of bolts 36. Bell crank 32 is also mechanically connected to control element 37 of energy substance control mechanism E. Member 31, bell crank 32 and control element 37 are so arranged that longitudinal movement of member 31 will cause corresponding vertical movement of control element 37. Alteration of the vertical position of control element 37 alters the amount or quantity of energy substance flowing from D through conduit 40, energy substance control mechanism E, and conduit 41 to prime mover C.

The operation of hereinbefore described mechanism will now be indicated. When master control device A and controlled device B are rotating at exactly the same speed, but in opposite directions, and when load control mechanism K is not actuated to rotate worm 134, bevel gears 115, 117 and 120 of differential gear assembly J will also rotate but spider 113 and consequently gear 111 will remain stationary. Inasmuch as bevel gear 111 does not rotate, gear 131, shaft 127, and gear 129 will also be stationary. Since worm 134 is not being rotated, worm gear 133, shaft 121, and bevel gear 126 will also remain stationary. Bevel gears 126 and 129 being stationary, bevel gear 124 is also stationary. In turn, this means that spider 122 and ring gear 120' are stationary. Since gear 136 carried by shaft 21 can rotate only when ring gear 120 rotates, gear 136 and shaft 21 remain stationary. With these conditions prevailing, element 37 of energy substance control mechanism E will remain in fixed position, thereby permitting a fixed quantity or volume of energy substance D to flow to prime mover C.

The condition wherein controlled device B is rotating at exactly the same speed as master control device A and no positional change has been made in the setting of load control mechanism K has been discussed. The condition will now be discussed wherein no positional change is made in the setting of load control mechanism K but the speed of controlled device B is greater than or less than the speed of rotation of master control device A. With these conditions prevailing, worm 134 and worm gear 133 are stationary. Therefore, the difference in rate of rotation of control device A and controlled device B will cause rotation of spider 113 and, consequently, of ring gear 111. Rotation of ring gear 111, in turn, produces rotation of gear 131, shaft 127, and bevel gear 129. As already mentioned, worm gear 133 is stationary and as a result shaft 121 and bevel gear 126 are also stationary. With bevel gear 126 stationary and bevel gear 129 rotating, bevel gear 124 also rotates while spider 122 and ring gear 120' are forced to rotate in cooperation with bevel gear 124. Since gear 136 is affixed to shaft 21 and meshes with ring gear 120', gear 136 and shaft 21 rotate also. With clutch 27 mechanically connecting shaft 21 and shaft 28, rotation of shaft 21 is communicated through clutch 27 and shaft 28 to servo-transmitter F. Servo-transmitter F, by reason of the rotation of shaft 28, transmits a signal by means of leads 29, 30, and 30' to servo-receiver G which, in turn, moves member 31 to the right or left, depending upon whether device B is running faster or slower than device A. This movement is communicated through bell crank 32 to control element 37. If controlled device B is rotating at a slower speed than control device A, control element 37 is moved in a direction to permit a larger quantity or volume of energy substance D to flow to prime mover C. If, on the other hand, controlled device B is rotating at a faster rate than control device A, control element 37 acts to decrease the flow of energy substance D to prime mover C. This alteration of the quantity or volume of energy substance D to prime mover C correspondingly alters the speed of rotation of prime mover C which, in turn, produces a corresponding change in speed of rotation of rotatable element 26 of controlled device B. When controlled device B attains exactly the same speed as control device A, the system will make no further adjustments in the rotative speed of prime mover C.

A third condition which may prevail will now be discussed. This third condition will exist when controlled device B and master control device A are rotating at exactly the same speed, but in opposite directions, and it is desired to increase or to decrease the load on prime mover C. As previously pointed out, when controlled device B and master control device A are rotating at exactly the same speed, spider 113 and ring gear 111 remain stationary. This means, in turn of course, that gear 131, shaft 127 and bevel gear 129 are also stationary. It will be understood of course that in order to alter the load on prime mover C to the desired load, load control mechanism K must be actuated by an operator, this actuation in turn producing rotation of shaft 135 and worm 134. Rotation of worm 134 causes corresponding rotation of worm gear 133, shaft 121, and bevel gear 126. Since bevel gear 129 is stationary while bevel gear 126 rotates, bevel gear 124, spider 122 and ring gear 120' must rotate. Rotation of ring gear 120' of course produces corresponding rotation of gear 136 and shaft 21. Rotation of shaft 21 is communicated through clutch 27 to shaft 28 and servo-transmitter F. Servo-transmitter F transmits this signal as hereinbefore described to energy substance control mechanism E. It will be understood, of course, that when it is desired to increase the load on prime mover C, load control mechanism K will be actuated by an operator so as to rotate worm 134 in one direction; when, on the other hand, it is desired to decrease the load on prime mover C, control mechanism K will be actuated so as to rotate worm 134 in the opposite direction. If there is any tendency for the prime mover to alter its speed during a change in the positional setting of load control mechanism K, this tendency is corrected by means of differential gear assembly J as hereinbefore described.

Although load control device K is designed to alter or regulate the load on prime mover C by alteration of the supply of energy substance D thereto, no change in the speed of prime mover C, other than a transitory one, can be accomplished by changing the positional setting of load control mechanism K. The reason for this is that the speed of prime mover C is controlled by control device A and controlled device B. Should a change in the amount or volume of energy substance D supplied to prime mover C, caused by a change in the positional setting of load control mechanism K, be sufficiently great to cause a change in the speed of prime mover C, then control device A and controlled device B automatically return prime mover C to its normal speed, making it necessary to again adjust the load on prime mover C to its proper value by actuation of load control mechanism K.

The nature and objects of the present invention having been completely described and illustrated, what I wish to claim as new and useful and to secure by Letters Patent is:

Apparatus for maintaining the speed of a rotative prime mover substantially constant under conditions of both constant and varying loads on said prime mover comprising, in combination, a primary differential gear assembly including a first and a second rotatable shaft coaxially arranged and a ring gear rotatable by said shafts when said shafts rotate at different speeds in opposite directions, a secondary differential gear assembly including a first and a second rotatable shaft coaxially arranged and a ring gear rotatable by said shafts when said shafts rotate at different speeds, said first shaft of said secondary differential gear assembly being mechanically connected to and rotatable by said ring gear of said primary differential gear assembly, a master control device having a rotatable element rotated at a controlled constant speed mechanically connected to said first shaft of said primary differential gear assembly for rotating said shaft, a controlled device having a rotatable element the speed of which is controlled by said prime mover mechanically connected to said second shaft of said primary differential gear assembly for rotating said shaft in the opposite direction from said first shaft of the primary differential gear assembly, physically operated means adapted to prevent rotation of said second shaft of said secondary differential gear assembly by said first shaft and also adapted to rotate said second shaft, a valve element for controlling the supply of energy substance to said prime mover and means coupling said valve element with the ring gear of said second differential assembly for transmitting the rotative motion of the ring gear of said secondary differential gear assembly to said valve element for regulating the supply of energy substance to said prime mover.

HEZZIE CLARK.

REFERENCES CITED

The following references are of record in the file of this patent:

UNITED STATES PATENTS

| Number | Name | Date |
|---|---|---|
| 1,222,547 | Jackson | Apr. 10, 1917 |
| 1,368,755 | Roddey | Feb. 15, 1921 |
| 1,749,569 | de Florez | Mar. 4, 1930 |
| 2,252,545 | Benz | Aug. 12, 1941 |
| 2,269,332 | Bench | Jan. 6, 1942 |
| 2,273,408 | Woodward | Feb. 17, 1942 |
| 2,352,736 | Richmond | July 4, 1944 |
| 2,399,685 | McCoy | May 7, 1946 |

FOREIGN PATENTS

| Number | Country | Date |
|---|---|---|
| 223,576 | Germany | June 25, 1910 |